Patented Nov. 13, 1951

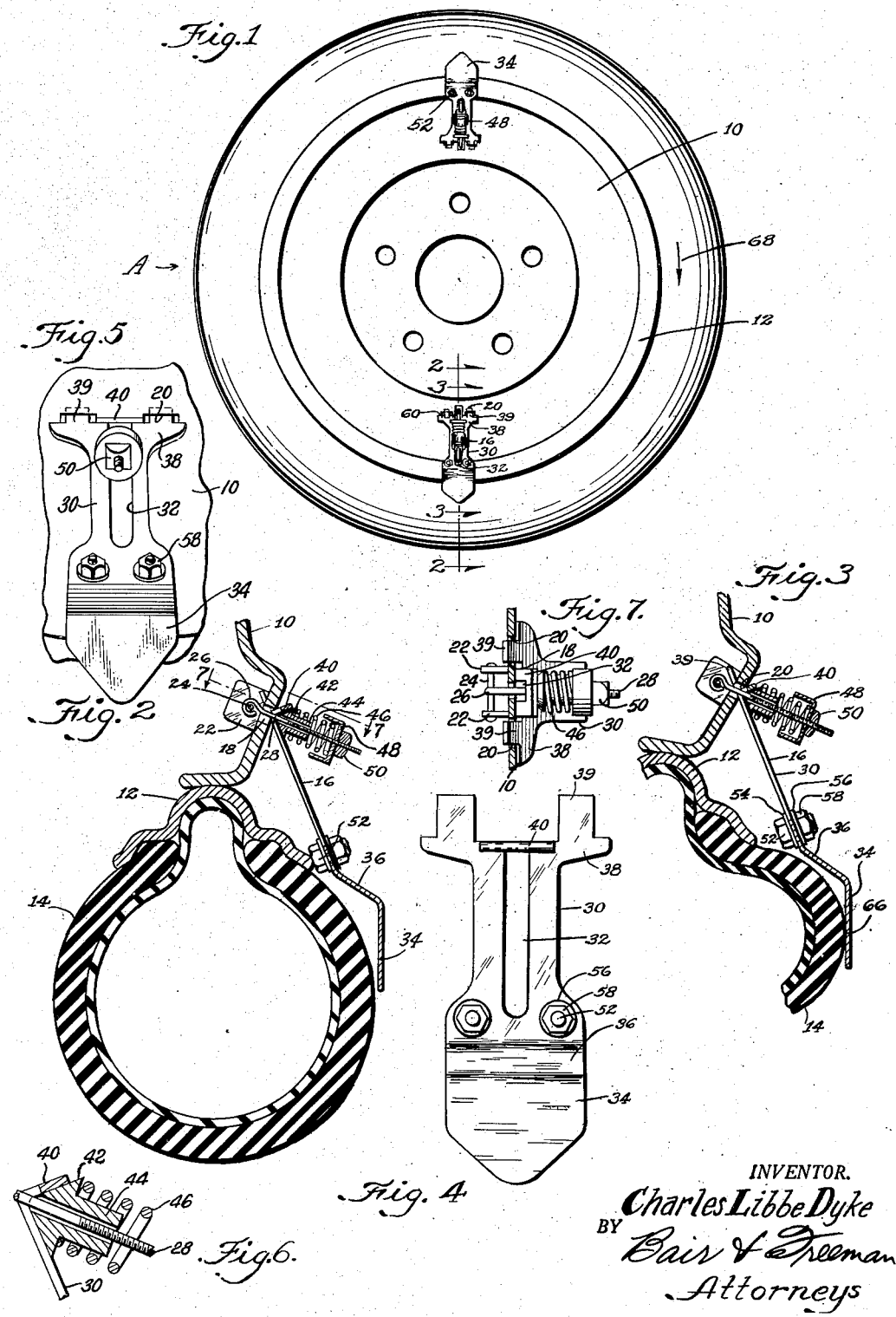

2,574,863

UNITED STATES PATENT OFFICE 2,574,863

LOW AIR PRESSURE ALARM FOR MOTOR VEHICLE TIRES

Charles Libbe Dyke, Orange City, Iowa

Application September 5, 1945, Serial No. 614,502

4 Claims. (Cl. 116—34)

My invention relates to a low air pressure alarm device for motor vehicle tires.

It is my purpose to provide such an alarm having a knocker arm which normally engages the wheel rim and is slightly spaced from the tire, and while in such position, makes no noise. My knocker arm is so pivotally mounted on the metal wheel disk that when the air pressure in the tire goes down a certain degree, the bulging of the tire will push or throw the knocker outwardly. As the wheel rotates and the knocker arm leaves the bulge, the knocker arm will swing back and strike the wheel rim, thus serving to make a noise and notify the driver of the condition of the tire.

With the above, and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 shows a side elevation of an automobile wheel and tire equipped with a low air pressure alarm embodying my invention, the hub cap being omitted in order that the other parts may be more clearly seen.

Figure 2 is a detail sectional view taken on the line 2—2 of Figure 1.

Figure 3 is a detail sectional view taken on the line 3—3 of Figure 1.

Figure 4 is a plan view of the knocker arm.

Figure 5 is a greatly enlarged elevation view of my low pressure alarm shown in Figure 1, and shows more clearly some of the structural details thereof.

Figure 6 is an enlargement of a portion of Figures 2 and 3, and is a cross-sectional detail view showing the cooperation between the pivot wedge and the crotch of the knocker arm.

Figure 7 is a greatly enlarged view taken on line 7—7 of Figure 2.

In the drawings, the reference numeral 10 indicates the metal disk type of motor vehicle wheel having the ordinary detachable rim 12, on which is the usual tire 14.

My low pressure alarm includes a knocker arm indicated generally at 16. I will now describe the way in which this knocker arm is assembled on the wheel disk 10. In the body of the disk of the wheel I cut a radially elongated slot 18. On the opposite sides of the slot 18 are oblong slots 20. On the inside of the wheel at the sides of the slot 18 and radially outwardly with relation to the slots 20 are fixed, spaced pairs of ears 22 connected by a pin 24 on which is mounted the eye 26 of an eye bolt 28.

The shape of the knocker arm 16 is illustrated in the drawing. It has a central waist portion 30 which may have a radially extending slot 32 provided simply to remove the weight of the metal. At its outer end the knocker arm has the heavy plate-like portion 34 slightly offset outwardly as indicated at 36. The inner end of the knocker arm has the laterally extending portion 38 in which are formed the radially inwardly extending lugs 39 which project into the slots 20. Between the lugs 39, the knocker arm 16 has an outwardly extending flange 40 into which the slot 32 extends to receive the eye bolt 28 as shown in Figure 2.

The edge of a pivot wedge 42 engages the bottom of the V formed by the body of the knocker arm 16 and its flange 40. The wedge 42 has a central outwardly projecting tubular extension 44 through which the eye bolt projects. On the eye bolt and on the tubular extension 44 is a coil spring 46 held in place by spring cap 48 and a nut 50 on the eye bolt. The tension of the spring can be adjusted by the adjustment of the nut 50.

On opposite sides of the outer end of the slot 32 are bolts 52 which are extended through the knocker arm, with their heads in position to strike the rim 12 in the operation of the knocker arm. Thin washers 54 are placed on the bolts 52 between their heads and the knocker arm 16 as shown, for instance, in Figure 3. On opposite sides of the knocker arm are washers 56 and adjustable nuts 58.

The number and thickness of the washers 54 will determine the tire pressure at which the alarm device will function by determining the distance from the tire at which the plate portion 34 is normally set.

In actual operation, when the car is traveling at a certain speed, say 20 miles or more per hour, the weight of the knocker arm effected by centrifugal force and the tension of the spring 46, holds the knocker arm with the heads of the bolts 52 against the rim and no noise is made. If, and when, the air pressure in the tire goes down, for example, from 35 to 25 pounds it is obvious that the tire will bulge as indicated at 66 in Figure 3, at its lower part next to the ground. This will throw the knocker arm out against the tension of the spring 46 to the position illustrated in Figure 3 where the bolts 52 are spaced from the tire rim.

As the tire rotates in the direction indicated by the arrow 68 in Figure 1, and the knocker arm moves from its position at the bottom of the tire illustrated in Figure 1 to position A, the knocker arm will swing toward the tire and the rim. There will be no bulge in the tire at position A.

The weight of the knocker arm plus the effect of centrifugal force, due to the forward movement of the car, plus wind pressure and spring tension, will cause the knocker arm to move sharply and strike the bolts 52 against the rim. This of course is repeated with great speed and the knocking noise affords an alarm to warn the driver that the air pressure in his tire is low.

When the knocker arm is thrown outward by the bulge in the tire, the force of the spring, the force of gravity and centrifugal force, which all normally tend to hold the knocker against the rim, are momentarily overcome, but as soon as the knocker arm leaves the bulge, these forces, to-wit, spring pressure, wind pressure and the momentum of the car causing centrifugal force to be effected, permit and cause the heavy plate portion 34 of the knocker arm to swing toward the tire and cause the bolts to strike the rim.

It should be noted that when the knocker arm is extending downwardly, the wind strikes its narrow edge, but when the knocker arm is at position A, the wind engaging the plate 34 is effective in cooperating with centrifugal force and spring tension to cause the loud knocking which affords a signal.

In my use of the knocker arm, I found that the sound is intensified by the knocker's tight and narrow connection with the metal of the wheel disk and the wheel cap, and that the wheel cap and wheel function as sounding boards to increase the intensity of the noise.

It will be noted that once the knocker arm is properly assembled and adjusted, no further adjustment is necessary during the life of the tire.

There are no parts which need to be oiled or greased. The knocker arm is noiseless except when affected by the bulge at the bottom of the tire when the tire pressure goes down.

I have thus provided a very simple, inexpensive and effective means for furnishing to the driver of a motor vehicle an alarm which will warn him when the tire pressure goes down.

Attention is directed to my copending application, Serial No. 516,417, now matured into Patent No. 2,400,107 issued May 14, 1946, entitled "Low Air Pressure Alarm for Pneumatic Vehicle Tires" which patent is directed to another form of low pressure alarm for motor vehicle tires.

While I have shown a particular embodiment of my invention, it will be understood of course that I do not wish to be limited thereto since many modifications may be made, and I therefore contemplate by the claims appended hereto to cover any such modifications or substitutions of equivalents as fall within the true spirit and scope of my invention.

I claim as my invention:

1. A low pressure alarm device for attachment to a vehicle wheel including a central disc having an outer flange and an inflated tire seated in said flange, said device comprising an arm, means for swingably connecting one end of said arm to said disc between the disc center and said flange, said arm extending past said flange and having its other end engageable with the side of said tire, said arm being shaped between its ends to permit constant contact with said flange only when said tire is fully inflated, a transverse flange on said arm at the point where said arm is swingably connected to said disc defining with said arm a V-shaped seat, a V-shaped wedge fitting said seat and lifted therefrom when said arm is swung away from said flange, resilient means biasing said wedge into said seat, and means for supporting said resilient means from said disc, whereby rotation of said wheel with said tire incompletely inflated and therefore laterally bulged at its bottom will effect intermittent knocking impact of said arm with said flange.

2. A device according to claim 1 for attachment to a vehicle wheel including a disc formed with two spaced apertures between the disc center and the disc flange, said device comprising means for swingably connecting the arm engageable with the tire side to said disc including spaced axial lugs on the connected arm end each projecting through one of said disc apertures and two aligned lateral projections from said arm abutting said disc outside said apertures defining a pivot for swinging said arm with respect to said wheel disc, said projections being aligned with the transverse flange on said arm.

3. A device according to claim 1 for attachment to a vehicle wheel including a disc formed with an aperture between the disc center and the disc flange, said device comprising an arm apertured at its V-shaped seat, an axially apertured wedge, resilient wedge biasing means and means for supporting said resilient means including a rod loosely threaded through said wedge aperture and projecting from both ends thereof, one end of said rod passing through said arm and disc apertures, means for swingably supporting said rod end from said disc, a collar on the other end of said rod, and a spring around said rod between said collar and said wedge.

4. A device according to claim 1 comprising an arm having a transverse projection of adjustable length opposed to the tire flange for knocking impact therewith when the tire is incompletely inflated.

CHARLES LIBBE DYKE.

REFERENCES CITED

The following references are of record in the file of this patent:

UNITED STATES PATENTS

| Number | Name | Date |
|---|---|---|
| 1,025,100 | Schneider | Apr. 30, 1912 |
| 1,729,619 | Laro | Oct. 1, 1929 |
| 1,763,639 | Christophersen | June 17, 1930 |
| 2,368,617 | Rykken | Feb. 6, 1945 |
| 2,400,107 | Dyke | May 14, 1946 |

FOREIGN PATENTS

| Number | Country | Date |
|---|---|---|
| 266,895 | Germany | Jan. 4, 1913 |